(No Model.)

C. HARDING.
MILK COOLER.

No. 516,705.   Patented Mar. 20, 1894.

Witnesses:
C. H. Raeder
H. F. Matthews.

Inventor
Charles Harding
By James J. Sheehy
Attorney

UNITED STATES PATENT OFFICE.

CHARLES HARDING, OF NORFOLK, NEBRASKA.

MILK-COOLER.

SPECIFICATION forming part of Letters Patent No. 516,705, dated March 20, 1894.

Application filed July 22, 1893. Serial No. 481,236. (No model.)

*To all whom it may concern:*

Be it known that I, CHARLES HARDING, a citizen of the United States, residing at Norfolk, in the county of Madison and State of Nebraska, have invented certain new and useful Improvements in Milk-Coolers; and I do declare the following to be a full, clear, and exact description of the invention, such as will enable others skilled in the art to which it appertains to make and use the same.

This invention has relation to improvements in creamers, or apparatus for setting and cooling milk for the purpose of allowing cream to form, and among other things it has for its object to provide an apparatus for the purpose described, which will insure a large amount of cream in proportion to the milk used.

A further object of the invention is to provide a creamer by which the creaming process may be conducted continuously at a comparatively small expense and which will effectively exclude flies and other insects as well as noxious odors.

Other objects and advantages will appear from the following description and claim when taken in connection with the annexed drawings, in which—

Figure 1:
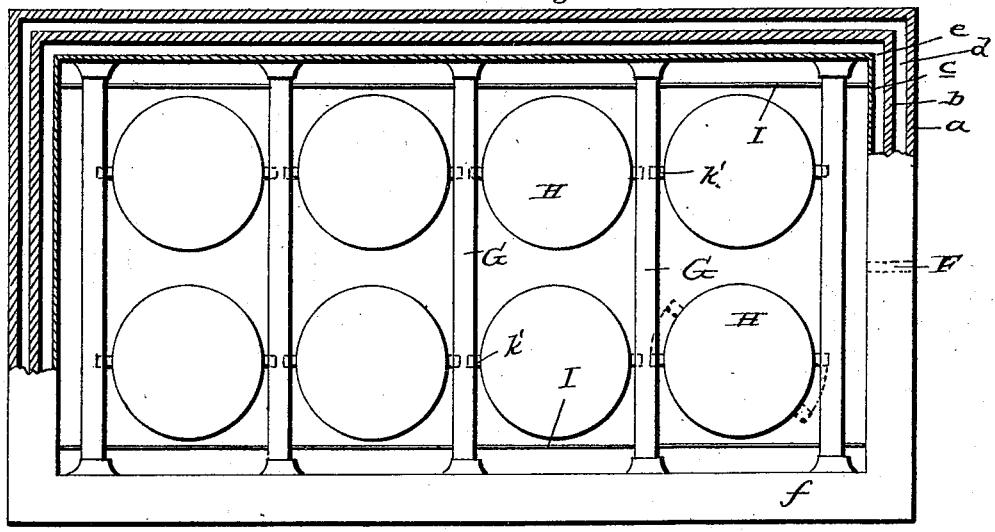
Figure 2:
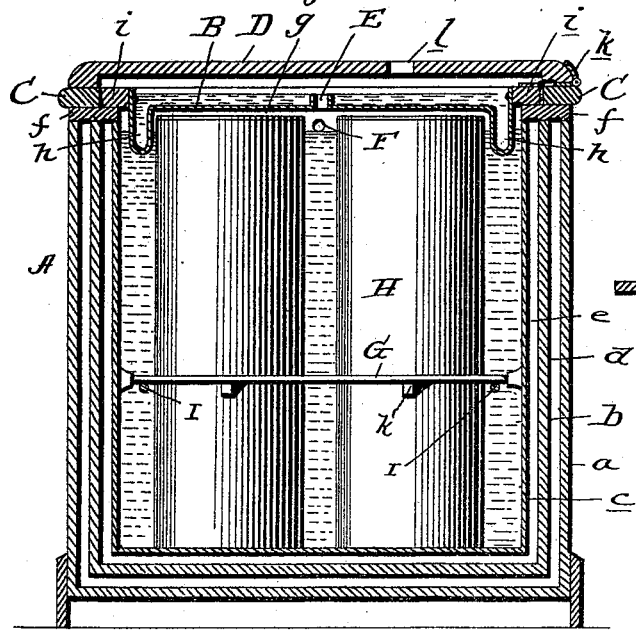
Figure 3:
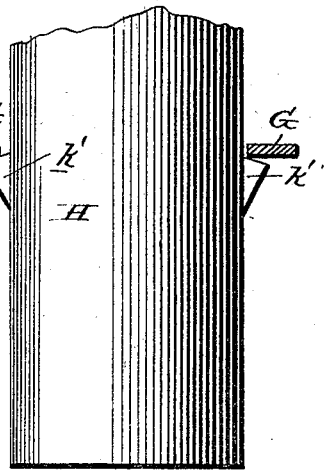

Figure 1, is a plan view of the box or vat with the cover removed, and a part of the walls in section. Fig. 2, is a vertical, transverse, sectional view of the same with the cans in position, and Fig. 3, is a side elevation of one of the cans partly broken away and the horizontal cross-bars in section.

Referring by letter to said drawings: A, indicates the box or vat. This box is of a peculiar construction and comprises an outer casing $a$, of wood, or other suitable material, a middle or intermediate casing $b$, of paper or the like, and an inner lining $c$, of galvanized iron, or other sheet metal, which will not be effected by moisture. The lining of galvanized iron, and the intermediate casing or interposed walls of paper, are so arranged and fixed with respect to each other as to form two dead air chambers $d$, and $e$, in the sides and bottom of the box. The tops of these chambers are covered by horizontal strips $f$ forming a rectangular frame, and by this construction, it will be readily seen that the contents of the box may be kept cool as it will not be effected by external heat, and the cold may be retained, by reason of such construction.

B, indicates a pan which may be made of galvanized iron or other suitable material. This pan which serves the additional function of a cover for the cans, is provided in its under side with an aperture $g$, to receive the tops of the cans, and depending from said pan is a marginal, vertical bend or flange $h$, which is designed to extend considerably below the tops of the cans and into the water in the box or vat so as to form a seal. Secured to this pan around its marginal edges, are strips $i$, of wood, or the like which form a rectangular frame, and the strip on one side, is hinged to one of the strips of a rectangular frame C, which is fixed upon the upper side of the strips or frame $f$, of the box or vat, so that the said pan may turn as a cover over the cans as better shown in Fig. 2, of the drawings.

D, indicates an outer cover which may be formed of wood, or the like. This cover is designed to cover the cans, and is connected with one of the strips of the frame C, by means of a hinge $k$, and said cover is also provided with a filling aperture $l$, whereby water may be run or poured into the pan, while the cover is closed, and in some cases, the supply of water may be continuous, as will presently appear.

The pan is provided with a central overflow aperture E, so that the water as it is filled into the pan, may pass down into the vat below, and the vat is provided with a draw-off or overflow aperture F, for the water therein. By this means it will be seen that when it is desired to have the water run continuously through the vat and around the cans, it is simply necessary to continue the supply through the filling aperture $l$, of the cover, when it will pass into the pan and out through the aperture E, down into the vat, and from thence through the aperture F, out of the vat; the bends or flange in the pan and the altitude of the aperture F, preventing any water from rising or entering the cans.

Fixed at suitable intervals, and at a suitable height within the box or vat, are transverse horizontal bars G. These bars are spaced so as to permit the cans H, to be placed between them.

I, indicates longitudinal, horizontal bars or rods, which are arranged at right angles to the bars G, and one on the outer side of each longitudinal series of cans. These bars or rods I, are fixed to the lining of the vat and also to the transverse bars G, at the points of intersection.

The cans H, which are here shown as of cylindrical form in outline, although it is obvious that other forms might be employed, are provided on their outer sides, at diametrically opposite points, with beveled lugs $k'$. These lugs $k'$, are arranged at a height upon the cans so as to snugly engage the under sides of the transverse horizontal bars G, when turned. By reason of the lugs $k'$, being beveled on their upper sides as illustrated, it will be perceived that they may be readily introduced beneath the cross bars G, and as the cans are turned, they will snugly engage the under sides of said bars so as to securely hold the cans in position.

In practice it will be seen that when the cans containing milk are placed in the box or vat, and then turned so as to bring their lugs firmly against the under sides of the cross bars G, such cans will be held in a truly upright position and prevented from casual displacement or shaking of the cans, which is necessary to attain in the operation, while should the lugs become disengaged, the cross bars would prevent the cans as they are raised by the water from tilting longitudinally within the vat, and the longitudinal rods I, will prevent the cans from tilting transversely or laterally within the vat, so I have provided means for locking the cans under ordinary circumstances, and I have also provided a cheap and efficient means for preventing the cans from tilting in any direction should they become disengaged from the cross bars.

A suitable draw-off-cock for the water may be provided in the bottom of the vat or in one of the side walls adjacent to the bottom.

Having described my invention, what I claim is—

The herein described milk-cooler, comprising the box or vat having an outer casing of wood, an intermediate casing of paper and a lining of galvanized iron, with dead air spaces between the wood and the paper and the galvanized iron and the paper, and also having the horizontal strips $f$, arranged upon and permanently connecting the outer casing, the intermediate casing and the lining, the frame C, fixedly connected to the strips $f$, the frame $i$, hinged to one of the strips of the frame C, the pan connected to the frame $i$, and having the depending flange or bend $h$, and the outer cover also hinged to one of the strips of the frame C, all as and for the purpose set forth.

In testimony whereof I affix my signature in presence of two witnesses.

CHARLES HARDING.

Witnesses:
BURT MAPES,
M. J. MOYER.